US007376611B1

(12) United States Patent
Jones

(10) Patent No.: US 7,376,611 B1
(45) Date of Patent: May 20, 2008

(54) DEMAND AGGREGATION AND DISTRIBUTION SYSTEM

(75) Inventor: Terrell B. Jones, Arlington, TX (US)

(73) Assignee: Sabre, Inc., Southlake, TX (US)

( * ) Notice: Subject to any disclaimer, the term of this patent is extended or adjusted under 35 U.S.C. 154(b) by 0 days.

(21) Appl. No.: 09/438,957

(22) Filed: Nov. 12, 1999

(51) Int. Cl.
*G06Q 40/00* (2006.01)

(52) U.S. Cl. ...................................................... 705/37

(58) Field of Classification Search ................ 705/37, 705/10, 23–28
See application file for complete search history.

(56) References Cited

U.S. PATENT DOCUMENTS

| | | | |
|---|---|---|---|
| 4,449,186 A | 5/1984 | Kelly et al. | |
| 4,799,156 A | 1/1989 | Shavit et al. | ................ 364/401 |
| 5,727,165 A | 3/1998 | Ordish et al. | |
| 5,732,398 A | 3/1998 | Tagawa | |
| 5,794,207 A | 8/1998 | Walker et al. | ................. 705/23 |
| 5,794,219 A * | 8/1998 | Brown | ........................ 705/37 |
| 5,835,896 A * | 11/1998 | Fisher et al. | ................... 705/37 |
| 5,845,265 A | 12/1998 | Woolston | ...................... 705/37 |
| 5,897,620 A | 4/1999 | Walker et al. | .................. 705/5 |
| 6,101,484 A * | 8/2000 | Halbert et al. | ................. 705/26 |
| 6,230,146 B1 * | 5/2001 | Alaia et al. | ..................... 705/37 |
| 6,260,024 B1 * | 7/2001 | Shkedy | ......................... 705/37 |
| 6,285,986 B1 * | 9/2001 | Andrews | ...................... 705/26 |
| 6,304,850 B1 * | 10/2001 | Keller et al. | .................... 705/5 |
| 6,418,415 B1 * | 7/2002 | Walker et al. | ................. 705/26 |
| 6,466,919 B1 * | 10/2002 | Walker et al. | ................. 705/37 |
| 6,631,356 B1 * | 10/2003 | Van Horn et al. | ............ 705/26 |
| 6,641,037 B2 * | 11/2003 | Williams | ...................... 235/383 |
| 6,876,983 B1 * | 4/2005 | Goddard | ....................... 705/37 |

FOREIGN PATENT DOCUMENTS

WO   WO 00/55780   9/2000

OTHER PUBLICATIONS

Getman, Frank, Sep. 1999, Power Engineering International, vol. 7, No. 7, pp. 56-60.*
Accompany—Internet Purchasing through aggregation, access & advocacy, http://www.accompany.com, 3 pages, 1999.
Telezoo.com: telecommunications Mar . . . Products and Connectivity Services, http://www.telezoo.com, 5 pages, 1998.
Demandline.com: How Demandline.com Works, http://www.demandline.com, 6 pages (accessed Jan. 6, 2000).

* cited by examiner

*Primary Examiner*—Andrew Joseph Rudy
(74) *Attorney, Agent, or Firm*—Alston & Bird LLP

(57) ABSTRACT

Methods, systems, and articles of manufacture consistent with the present invention use a data processing system to aggregate information reflecting demand for an item based on input requests associated with the item, each request having been received from a remote user and including remote user identification information, provide the aggregated information to a plurality of suppliers, each capable of supplying the item, receives at least one proposed response from at least one of the suppliers, including a proposal for providing the item to the remote users, and provides the proposed response to the remote users based on the remote user identification information. Aggregated information is provided without the remote user identification information associated the requests.

21 Claims, 6 Drawing Sheets

DEMAND AGGREGATION AND DISTRIBUTION SYSTEM

BACKGROUND OF THE INVENTION

A. Field of the Invention

This invention relates to electronic commerce and, more particularly, to an apparatus and methods for determining consumer demand for goods and services such as travel-related products. This invention also relates to an apparatus and methods for distributing information reflecting consumer demand for goods and services to multiple suppliers capable of supplying the goods and services in demand for the purpose of packaging goods and services and offering those packages to the consumers.

B. Description of the Related Art

The Internet has been hailed the marketplace of the future, a result of its accessibility and usability. A computer equipped with a communication mechanism such as a modem and telephone connection is nearly all that is necessary to gain access to the Internet. A program called a browser, such as the Netscape Navigator from Netscape Corporation, makes it a simple task to traverse the vast network of information available on the Internet and, specifically, its subpart known as the "World Wide Web."

The architecture of the Web follows a conventional client-server model. The terms "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a conventional protocol called "HyperText Transfer Protocol" (HTTP).

In operation, a browser opens a connection to a server and initiates a request for a document. The server delivers the requested document, typically in the form coded in a standard such as the "HyperText Markup Language" (HTML) format. After the document is delivered, the connection is closed. The browser displays the document or performs a function designated by the document.

Every day, more people gain access to the Web, and every day, more of them are shopping online. Online shopping provides a level of convenience they want, need and will soon demand. Electronic commerce or "e-commerce" is the term often used to refer, at least in part, to online shopping on the Web. E-commerce is a unique opportunity for businesses of any size. E-commerce can expand a company's marketplace-and consequently, its customer database. By simply providing a Web server having information on the company's product offerings and the customer database, and linking the Web server to the Web, the company can track visits, sales, buying trends and product preferences—all at the customer level. The company can then present its customers with products they are most likely to buy—on an individual basis. For this reason alone most marketing professionals consider the Web to be one of the best direct marketing tools.

But the number of retailers with online stores is growing exponentially every year, making it increasingly difficult for online shoppers to navigate the Web to locate particular products at the best prices. This challenge for consumers also introduces a problem for merchants in designing campaigns to attract consumers to the merchants' Web sites and away from their competitors' sites.

Certain known business methods, and conventional implementations of those methods on the Internet, give consumers greater control over a business deal by permitting consumers to request products and services and set the price they are willing to pay for those products and services, such as travel products like airfare, car rentals, and similar travel commodities. See, for example, systems disclosed in U.S. Pat. Nos. 5,794,207 and 5,845,265. One example of this type of business method is currently available on the Internet at the Uniform Resource Locator ("URL") www.priceline.com. Priceline.com claims to communicate consumer demand for products and services derived from the requests directly to suppliers or to their private databases. Consumers agree to hold their offers open for a specified period of time to enable priceline.com to fulfill their offers from inventory provided by the suppliers. By requiring consumers to be flexible with respect to suppliers, priceline.com claims to enable suppliers to generate incremental revenue without disrupting their existing distribution channels or retail pricing structures. But this approach fails to recognize the importance of the information on consumer demand that is not satisfied by the inventory provided by the suppliers.

Other business methods, and conventional implementations of those methods on the Internet, also collect demand but for a different purpose. One conventional approach (currently located at the URL www.accompany.com) collects demand for a particular product or service for the purpose of securing increased savings on that product or service based on the demand. For example, using this approach one to five consumers would obtain a particular discount on a product but if an additional consumer also seeks to obtain the same product then all six consumers would obtain a further discount. Like the priceline.com example, this too fails to recognize the importance of the information on consumer demand that is not satisfied by the inventory provided by the suppliers.

There is therefore a need for a system that can attract more consumers to a Web server by delivering products and services based on demand collected from consumers but not otherwise satisfied by suppliers. Such a system not only permits the server to expose more consumers to its products and services but also it permits the server to expose an increasing number of consumers to information such a as advertisements for products and services.

SUMMARY OF THE INVENTION

Methods, systems, and articles of manufacture consistent with the present invention overcome the shortcomings of existing systems by aggregating and satisfying demand for items. In one implementation consistent with the present invention a data processing system aggregates information reflecting demand for an item based on input requests associated with the item, each request having been received from a remote user and including remote user identification information, provides the aggregated information to a plurality of suppliers, each capable of supplying the item, receives at least one proposed response from at least one of the suppliers, including a proposal for providing the item to the remote users, and provides the proposed response to the remote users based on the remote user identification information. Aggregated information is provided without the remote user identification information associated the requests.

In another implementation consistent with the present invention that aggregates and satisfies demand for travel products, a data processing system aggregates information reflecting demand for a set of travel products based on input requests, each request having been received from a remote user and including remote user identification information, selects a group travel product based on the aggregated information, and provides information reflecting the group travel product to the remote users based on the remote user identification information. To select the group travel product based on the aggregated information, the data processing system may provide the aggregated information to a plurality of travel product suppliers, and receive responses from a set of the travel product suppliers, each response including information reflecting a proposed group travel product, wherein each proposed group travel product reflects a discount for the corresponding travel product that is determined based on the aggregated information. With this approach for selecting the group travel product, information reflecting the group travel product may be provided to the remote users based on the remote user identification information by transmitting travel option information related to at least one of the proposed group travel products to a set of the remote users based on the aggregated information.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
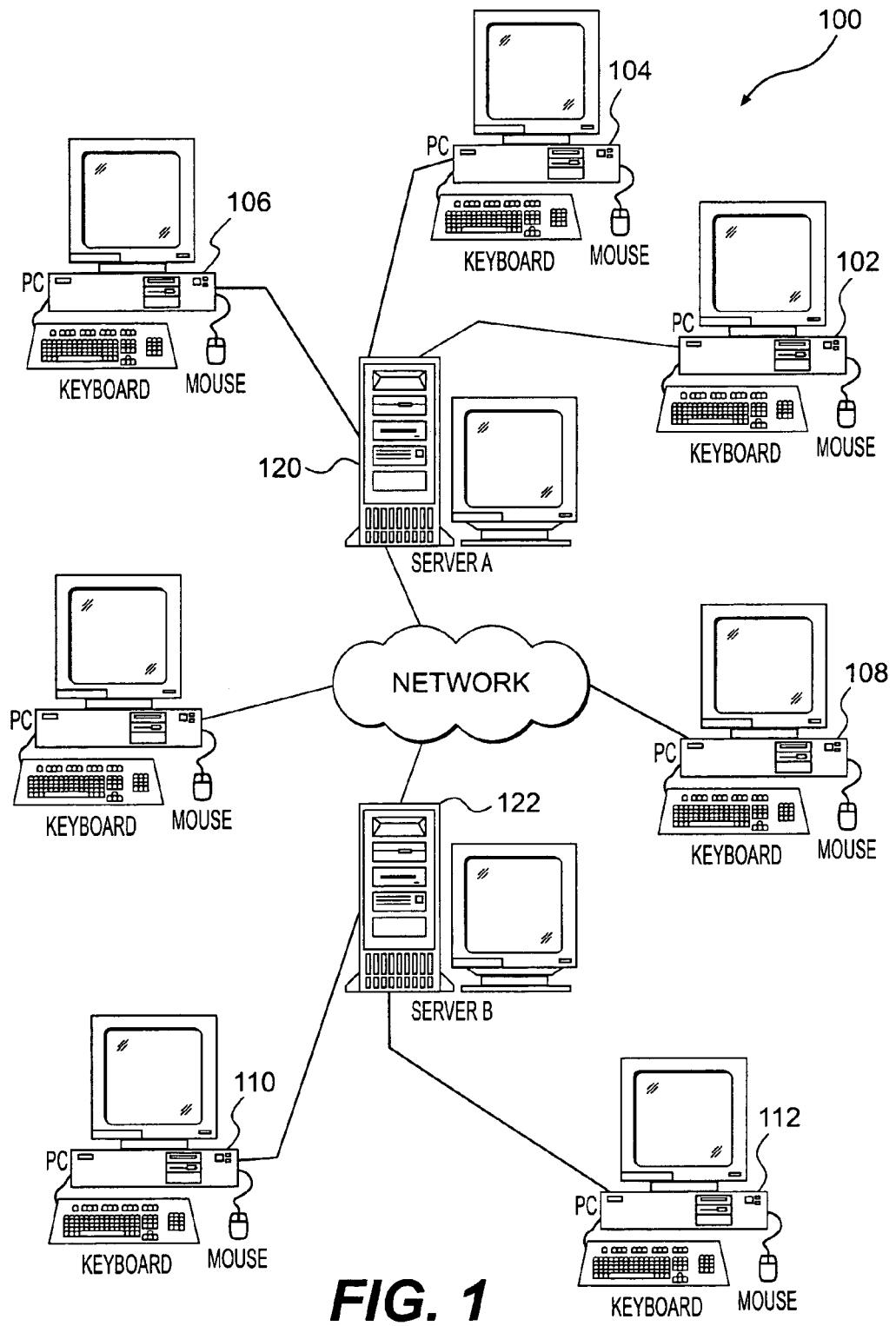
FIG. 1 is a pictorial diagram of a computer network in which systems consistent with the present invention may be implemented.

Reference will now be made in detail to an implementation consistent with the present invention as illustrated in the accompanying drawings. Wherever possible, the same reference numbers will be used throughout the drawings and the following description to refer to the same or like parts.

Introduction

Systems consistent with the present invention enable consumers to specify demand for particular goods and services. The systems use this information to target particular goods and services to the consumers.

Systems consistent with the present invention collect consumer demand for particular goods and services. In the case of travel, this demand may include preferred travel itineraries, including the location of departure and destination, travel dates, and period of stay at the destination.

The systems then derive a package including a set of goods or services capable of satisfying the consumer demand. In the travel example, a package may include all components of the consumers' preferred travel itinerary, i.e., round trip airfare and accommodations during a stay at the destination.

The package may be derived from stored information reflecting the goods and services available from multiple suppliers. In another configuration, suppliers capable of providing the goods and services in demand may be notified of demand from a pool of consumers and asked to provide one or more components to a package. Again in the travel example, a repository such as a computerized reservation system ("CRS"), an example of which is available from Sabre, Inc., may be used to identify the suppliers as well as their inventory of travel products such that a set of products can be combined to form a package. The CRS also has pricing information with which to properly price the package. Alternatively, the repository, such as a CRS, may be used to identify potential suppliers for a package for the purpose of seeking input from each potential supplier on a component or components for a package.

Information reflecting these packages is then provided to selected consumers based on the demand information. If a consumer indicates interest in travel from point A to point B, he receives information on any packages satisfying this interest. The consumer generally does not receive information on any other packages unless a determination is made that such other package(s) would be of interest to the consumer. For example, it may be determined that a package involving travel from point A to point C might be of interest to a particular consumer because of a relationship between points B and C. In this event, the consumer that indicates interest in travel from point A to point B may also receive information on a package from point A to point C.

Systems consistent with the present invention may also be used to complete a transaction involving a package offered to the consumers by accepting payment for the package. Additionally, payment may be made to the supplier(s) of component(s) of the package based on the component provided. At this point the component supplier(s) may learn the identity of the consumer(s) making the purchase for the first time. This protects the consumer from unwanted solicitations directly from the suppliers.

Network Architecture

FIG. 1 illustrates a conceptual diagram of a computer network 100, such as the Internet. Computer network 100 comprises small computers (such as computers 102, 104, 106, 108, 110 and 112) and large computers (such as servers 120 and 122). In general, small computers are "personal computers" or workstations and are the sites at which a human user operates the computer to make requests for data from other computers or servers on the network. Usually, the requested data resides in large computers. In this scenario, small computers are clients and the large computers are servers.

In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a file from server A 120. Since computer 102 is directly connected to server A 120, for example, through a local area network, this request would not normally result in a transfer of data over what is shown as "network" of FIG. 1. The "network" of FIG. 1 represents, for example, the Internet, which is an interconnection of networks. A different request from computer 102 may be for a file that resides in server B 122. In this case, the data is transferred from server B 122 through the network to server A 120 and, finally, to computer 102. The distance between server A 120 and server B 122 may be very long, e.g. across continents, or very short, e.g., within the same city. Further, in traversing the network the data may be transferred through several intermediate servers and many routing devices, such as bridges and routers.

Figure 2:
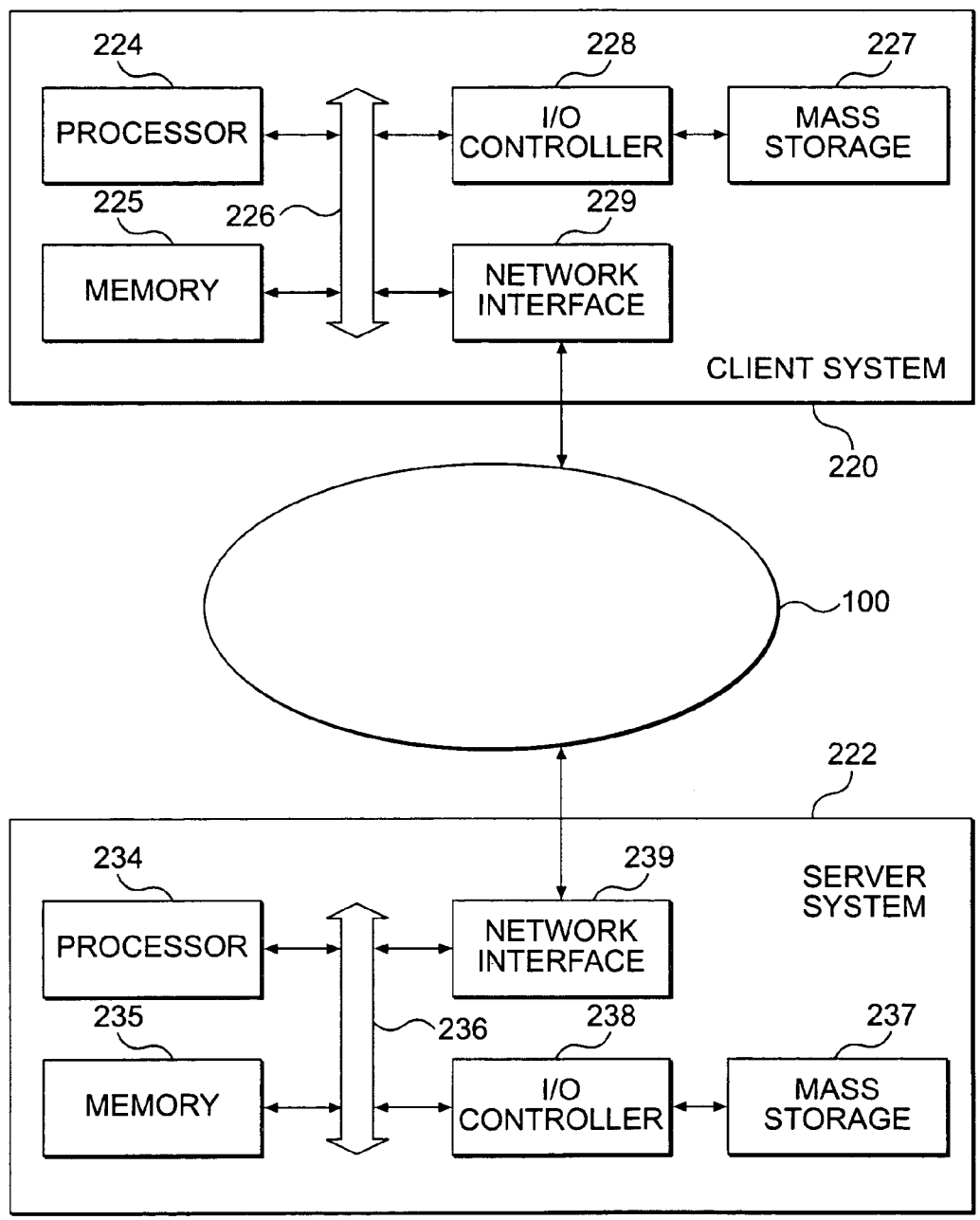
FIG. 2 shows a computer network containing a client system and a server system.

FIG. 2 shows, in more detail, an example of a client-server system interconnected through network 100. In this example, a server system 222 is interconnected through network 100 to client system 220. Client system 220 includes conventional components such as a processor 224, memory 225 (e.g. RAM), a bus 226 which couples processor 224 and memory 225, a mass storage device 227 (e.g. a magnetic hard disk or an optical storage disk) coupled to processor 224 and memory 225 through an I/O controller 228 and a network interface 229, such as a conventional modem.

Server system 222 also includes conventional components such as a processor 234, memory 235 (e.g. RAM), a bus 236 which couples processor 234 and memory 235, a mass storage device 237 (e.g. a magnetic or optical disk) coupled to processor 234 and memory 235 through an I/O controller 238 and a network interface 239, such as a conventional modem. It will be appreciated from the description below that the present invention may be implemented in software which is stored as executable instructions on a computer readable medium on the client and server systems, such as mass storage devices 227 and 237 respectively, or in memories 225 and 235 respectively.

Distributed Document Retrieval

The Internet consists of a worldwide computer network that communicates using well defined protocol known as the Internet Protocol (IP). Computer systems that are directly connected to the Internet each have an unique address consisting of four numbers separated by periods such as "192.101.0.3". To simplify Internet addressing, a "Domain Name System" was created that allows users to access Internet resources with a simpler alphanumeric naming system. For example, the name "travelocity.com" is the name for a computer operated by SABRE Inc.

To further define the addresses of resources on the Internet, a Uniform Resource Locator system was created that uses a Uniform Resource Locator (URL) as a descriptor that specifically defines a type of Internet resource and its location. URLs have the following format: "resource-type:// domain.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing text (in ASCII) that is written in HTML. Such objects often contain hyperlinks to other Web documents. The Web browser displays the HTML document on the screen for the user and the hyperlinks to other Web documents are emphasized in some fashion such that the user can selected the hyperlink.

Figure 3:
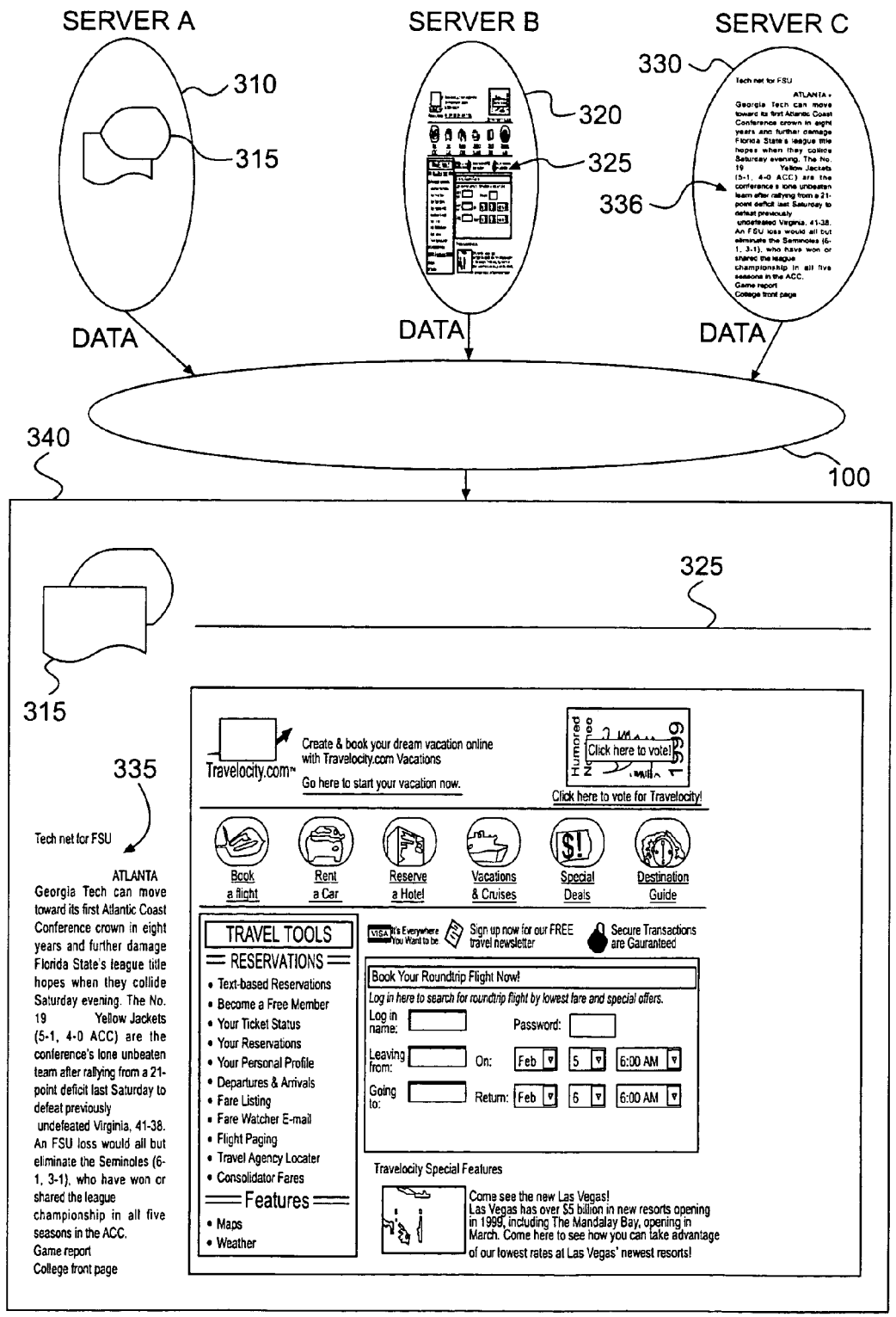
FIG. 3 illustrates the retrieval of remote image and text and their integration in a document.

In some instances, the HTML document may contain data from more than one server. For example, FIG. 3 illustrates the retrieval of remote text and images and their integration in a Web document by a client system 340. In FIG. 3, server A 310 contains an image 315, server B 320 contains a combination of text and image data 325 and server C 330 contains text data 335. Each of these servers is remotely located from the other servers and client 340. The transfer of data is via network 100. It should be appreciated that the text and image files could be located in the same server which is remote from client 340.

Different techniques are available to display these types of composite Web documents. For example, a program called a servlet executing on one of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

System Architecture and Operation

Figure 4:
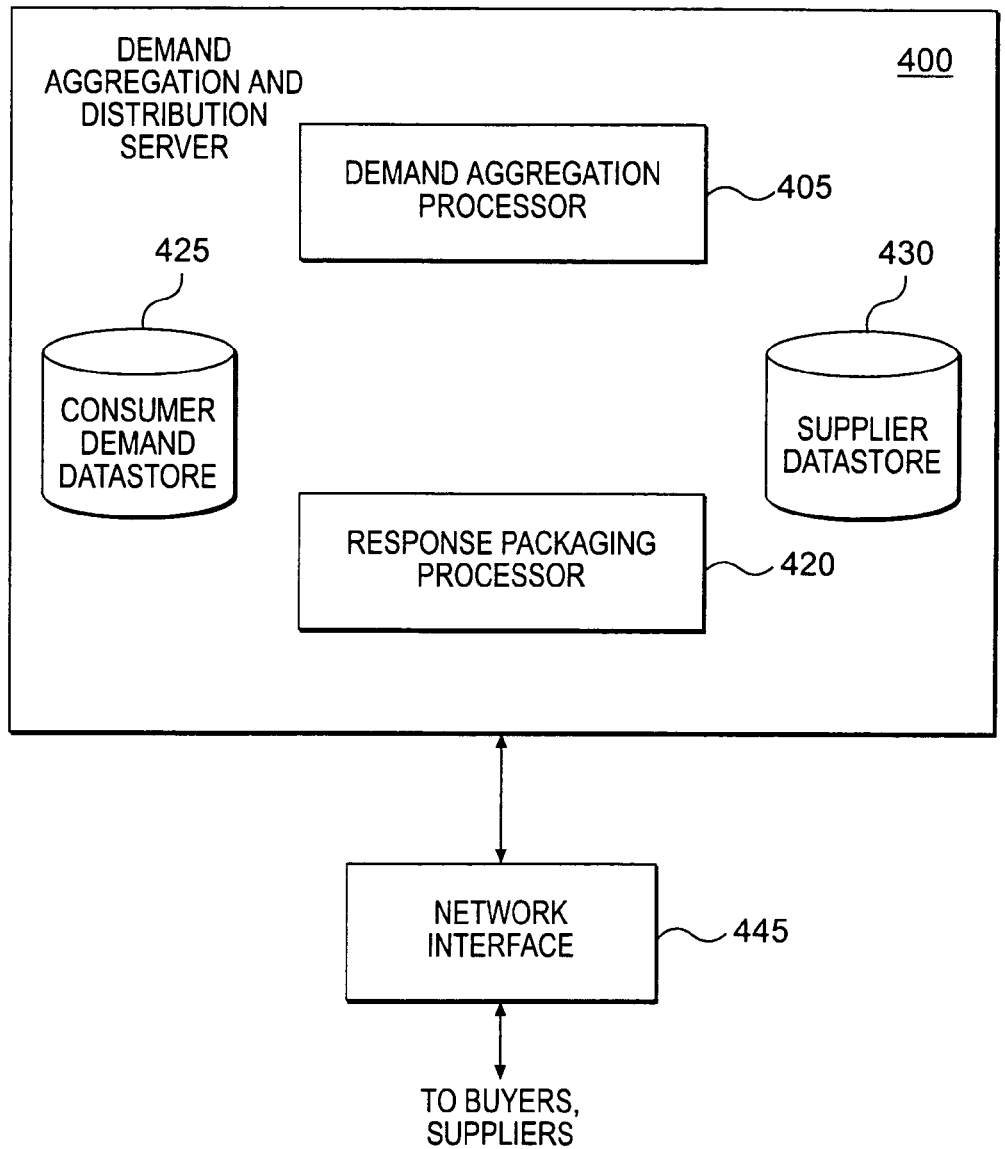
FIG. 4 illustrates a savings discovery server and its relationship to other computers in a manner consistent with the principle of the present invention.

Systems consistent with the present invention employ a demand aggregation and distribution server, for example, the server 400 shown in FIG. 4. Server 400 is connected to a network interface 445 that facilitates communication with consumers and suppliers on the Internet. Server 400 includes a number of components, demand aggregation processor 405, response packaging processor 420, consumer demand datastore 425 and supplier datastore 430. The operation of each of these components will be explained below with reference to FIGS. 5 and 6.

Figure 5:
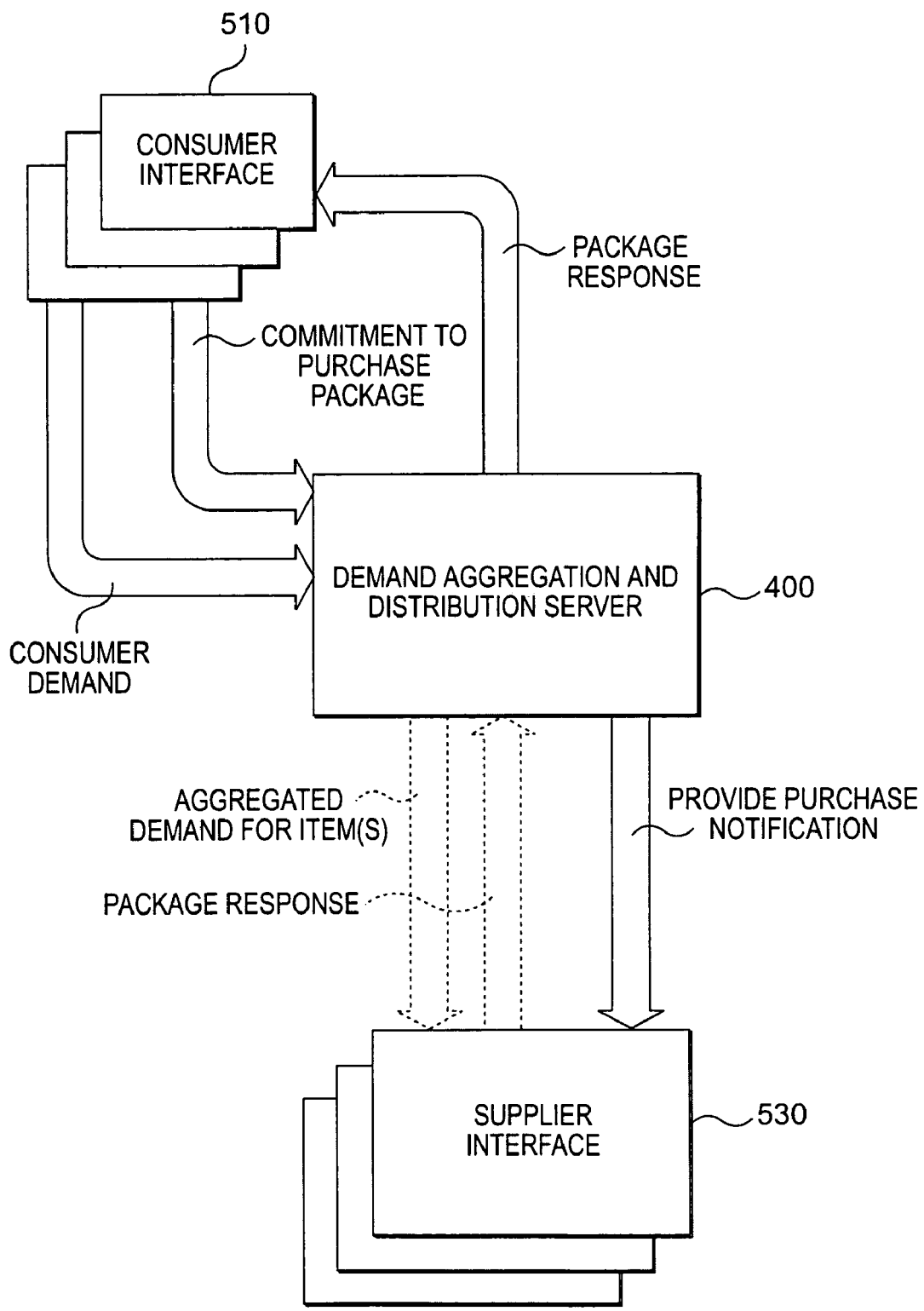
FIG. 5 is a block diagram of the architecture of a savings discovery server in a manner consistent with the principle of the present invention.

FIG. 5 shows a demand aggregation and distribution server 400 and machines distributed in the network having facilities such as interfaces for a consumer and supplier to communicate with server 400. These interfaces may be, for example, Web browser programs. FIG. 5 illustrates an example of this configuration with consumer interface 510 and supplier interface 530 communicably connected to server 400. As shown multiple consumers and multiple suppliers connect to and communicate with server 400.

Consumer demand for particular goods and services is stored in datastore 425. For example, datastore 425 may include information reflecting a particular consumer's interest (i.e., demand) for a particular product. The datastore 425 also includes information identifying the consumer. This identifying information may be used to contact the consumer when the product in demand or a product that is determined to be a comparable product becomes available. For example, the identifying information may be selected from the group consisting of the consumer's name, street address, telephone number, facsimile number, and e-mail address.

In one configuration, suppliers provide information on available goods and services. This information is stored in datastore 430. For example, datastore 430 may include a product inventory, such as seats available on scheduled flights, rooms available in hotels, cars available at airports for rental, and similar travel resources. This inventory may be combined in advance by suppliers into packages, or response packaging processor 420 can perform this function. In an alternative configuration, datastore 430 may include information identifying suppliers and reflecting the ability of suppliers to satisfy demand for particular goods and services but not specific information on the inventory of the suppliers. In this case, suppliers capable of satisfying consumer demand for particular goods and services can be identified with reference to datastore 430 but the selected suppliers based on the stored information would have to be contacted to determine whether those suppliers have the necessary inventory to satisfy the demand.

In operation, server 400 receives demand information from consumers, including for example information reflecting interest in acquiring particular products and services. This information can be gathered using a variety of conventional approaches. For example, a lottery may be used with a free prize to the winner. Each consumer (i.e., a perspective buyer) would fill out an entry form for the lottery available at the server 400. The form would include fields for information on the consumer's travel demand. For example, a group of consumers may indicate that they all wish to travel from New York, N.Y. to Miami, Fla. on Dec. 23, 1999 and return to New York on Jan. 5, 2000. One participant in the lottery would win a free prize, for example, a trip of the participant's design or a trip specified by the operator. The server 400, however, would maintain the demand information.

Consumer interface 510 allows each buyer to input information reflecting demand for products and services. Datastore 425 persistently stores the consumers' demand for subsequent access/marketing analysis. The interface 510 also permits each consumer to receive information from the server 400, including information on package responses. In the example where multiple consumers indicate an interest in round trip travel between New York and Miami on particular dates, server 400 would offer those consumers a travel package including, for example, the requested round trip travel, accommodations during their stay in Miami and transportation such as a car rental. Information on such a package may be stored in the supplier datastore 430. Alternatively, server 400 may provide available suppliers with information on the aggregated consumer demand with the suppliers providing the package responses. The server 400 would then offer all of the package responses to the consumers or select one or more of the responses and provide only the selected response(s) to the consumers.

Supplier interface 530 allows product and service suppliers to input, configure, target, and maintain products, including pre-packaged products and services in the datastore 430. This datastore 430 may contain pre-packaged offerings of products and services that have been pre-configured and pre-negotiated by consolidators. Alternatively, in the configuration where server 400 provides available suppliers with information on the aggregated consumer demand with the suppliers providing the package responses, the information identifying suppliers in datastore 430 may be used to locate the available suppliers to whom the demand information should be transmitted.

Figure 6:
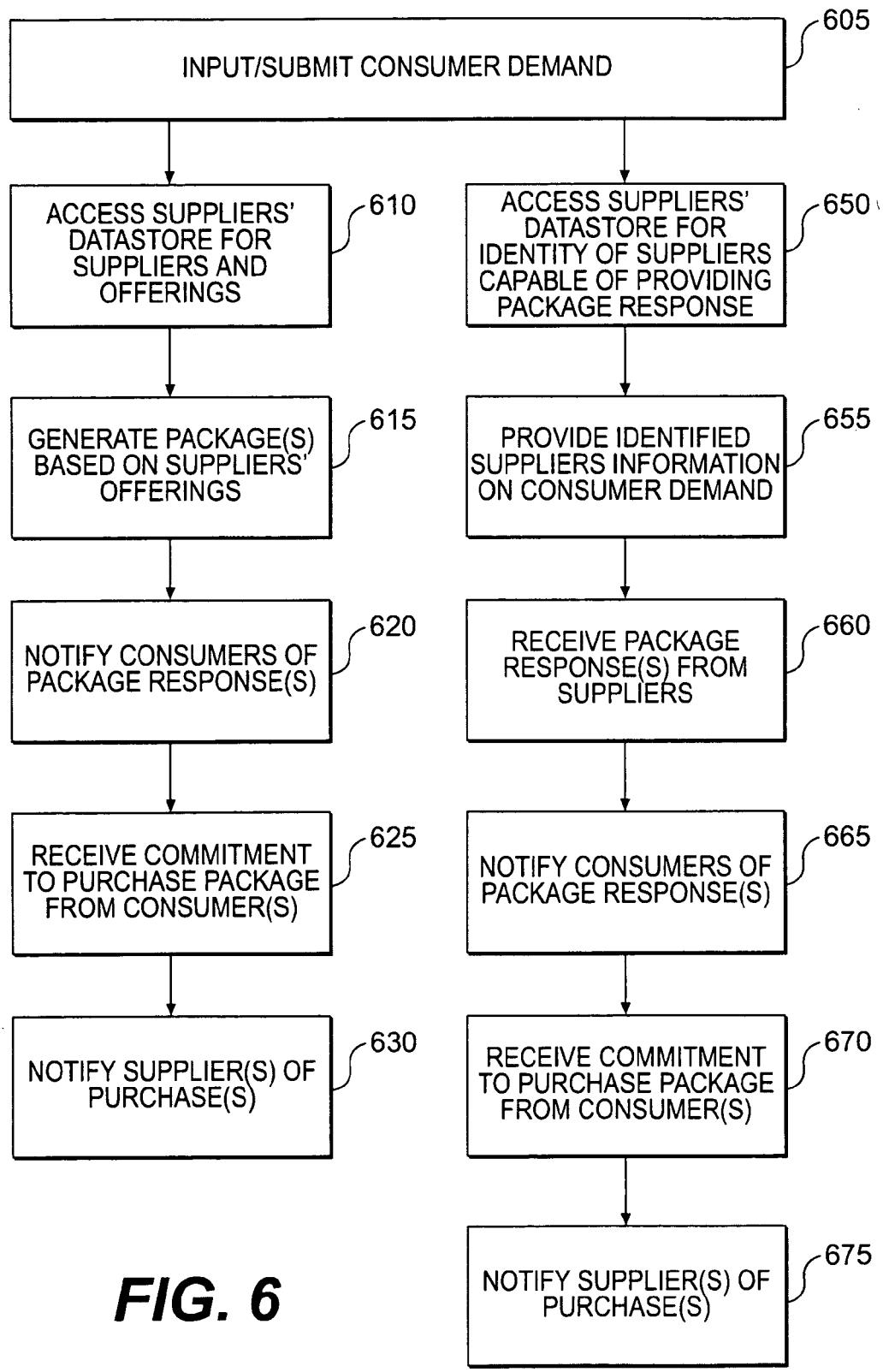
FIG. 6 is a flow chart of the steps performed by a savings discovery server in a manner consistent with the principle of the present invention.

FIG. 6 is a flow chart of the operations performed by server 400. Two alternative methods of operation are illustrated (i.e. steps 610 to 630 and steps 650 to 675). In the first step of both methods the server 400 receives the buyers' demand for products and/or services (step 605). Preferably, demand aggregation processor 405 performs this operation. Then in the first method, after server 400 receives the demand information (and stores it in datastore 425), server 400 accesses datastore 430 for information on suppliers and their offerings (e.g., products and services) (step 610) for the purpose of generating one or more package responses (step 615). Response packaging processor 420 performs this operation. For example, one supplier may offer round trip air travel between New York and Miami and another supplier may offer hotel accommodations in Miami. In this case server 400 combines information on the offerings of both of these companies together into a package.

Server 400 then uses response packaging processor 420 to notify the relevant consumers, based on the demand information, of the available package(s) that likely satisfy the consumer demand (step 620). Server 400 uses the stored identification information for consumers to perform this notification step. Assuming consumers are interested in purchasing a package provided by server 400, response packaging processor 420 may receive a purchase commitment from one or more consumers (step 625). This commitment can take the form of an unsecured reservation or a purchase using, for example, a credit card or other electronic payment method. The server 400 then notifies the relevant supplier(s) of the purchase commitments received from the consumers (step 630). This notification may simply be a indication of the purchase commitment or it may include a payment to the supplier(s) for the purchased package. With the latter approach, suppliers do not have access to information identifying the consumers until after the consumer commits to a particular package. This protects the consumer's anonymity from the supplier(s) until after a purchase commitment is made.

In the alternative operation, server 400 accesses datastore 430 for information identifying suppliers capable of providing one or more components to a package derived from the consumer demand information (step 650). Server 400 then provides information on the consumer demand to the identified suppliers (step 655) and receives any responses with information useful for a package response (step 660). For example, Alpha Airlines may be identified as a potential supplier to respond to consumer demand. Alpha Airlines may respond with information reflecting an offer to carry 50 or more consumers from New York to Miami on Dec. 23, 1999 at a particular airfare. Hospitality Hotels may have also been identified as a potential supplier to respond to consumer demand. The hotel company may have responded with information reflecting an offer to house 50 or more consumers between Dec. 23, 1999 to Jan. 3, 2000 at a particular price per room per night. Server 400 combines this information into a package response and notifies the relevant consumers (step 665). Alternatively, one supplier may provide a complete package response that server 400 passes on to the consumers. The remaining steps 670 and 675 are the same as steps 625 and 630 of the first method.

CONCLUSION

As explained, systems consistent with the present invention permit consumers to specify demand for particular goods and services. Such systems use this demand information to target packages of goods or services to the consumers.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for aggregating and satisfying demands from different users for at least one item, the method comprising the steps performed by a data processing system of:

electronically aggregating information reflecting demand for an item based on input requests from different users for the item, each request having been received from a different user and including user identification information associated with the different user, wherein said aggregating step aggregates requests from different users for the item and the information for each different user is aggregated independent of a commitment by the different users to purchase the item;

providing aggregated information to a plurality of suppliers, each capable of supplying the item without also providing the different user's user identification information from the request;

receiving at least one proposed response from at least one of the suppliers, including a proposal for providing the item to the different users; and providing the proposed response to each of the different users based on the user identification information associated with each different user, wherein the different users can determine whether to commit to purchasing the item.

2. A method for aggregating and satisfying demands from different users for travel products, the method comprising the steps performed by a data processing system of:

electronically aggregating information reflecting demand for a set of travel products based on input requests from different users, each request having been received from a different user and including user identification information, wherein said aggregating step aggregates requests from different users for the item and the information for each different user is aggregated independent of a commitment by the different users to purchase the item;

selecting a proposed group travel product based on the aggregated in formation; and providing information reflecting the proposed group travel product to each of the different users based on the user identification information, wherein the different users can determine whether to commit to purchasing the item.

3. The method of claim 2, wherein the step of selecting a group of travel product based on the aggregated information includes the substeps of:

providing the aggregated information to a plurality of travel product suppliers, wherein said providing step provides the information independent of a commitment by the different users to purchase the travel products; and receiving responses from a set of the travel product suppliers, each response including information reflecting a proposed group travel product, wherein each proposed group travel product reflects a discount for the corresponding travel product that is determined based on the aggregated information, and wherein the step of providing information reflecting the group travel product to the different users based on the user identification information includes the substep of:

transmitting travel option information related to at least one of the proposed group travel products to a set of different users based on the aggregated information, wherein the different users can determine whether to commit to purchasing the travel products.

4. A system for aggregating and satisfying demands from different users for at least one item, comprising:

a processor for executing programs; and a memory for storing a program executable by the processor, the stored program including instructions for (i) aggregating information reflecting demand for an item based on input requests from different users for the item, each request having been received from a different user and including user identification information, wherein said aggregating step aggregates requests from different users for the item and the information for each different user is aggregated independent of a commitment by the different user to purchase the item, (ii) providing aggregated information to a plurality of suppliers, each capable of supplying the item without also providing user identification information from the requests, (iii) receiving at least one proposed response from at least one of the suppliers, including a proposal for providing the item to the different users, and (iv) providing the proposed response to the different users based on the remote user identification information, wherein the different users can determine whether to commit to purchasing the item.

5. A system for aggregating and satisfying demands from different users for travel products, comprising:

a processor for executing programs; and memory for storing a program executable by the processor, the stored program including instructions for (i) aggregating information reflecting demand for a set of travel products based on input requests from different users, each request having been received from a different user and including user identification information, wherein said aggregating step aggregates requests from different users for the item and the information for each different user is aggregated independent of a commitment by the different user to purchase the travel products, (ii) selecting a proposed group travel product based on the aggregated information, and (iii) providing information reflecting the proposed group navel product to the different users based on the user identification information, wherein the different users can determine whether to commit to purchasing the travel products.

6. The system of claim 5, wherein selecting a group of travel products based on the aggregated information includes (a) providing the aggregated information to a plurality of travel product suppliers, wherein said providing step provides the information independent of a commitment by the different users to purchase the item; and (b) receiving responses from a set of the travel product suppliers, each response including information reflecting a proposed group travel product, wherein each proposed group travel product reflects a discount for the corresponding travel product that is determined based on the aggregated information, and wherein providing information reflecting the group travel product to the different users based on the user identification information includes (a) transmitting travel option information related to at least one of the proposed group travel products to a set of different users based on the aggregated information, whereby the different users can determine whether to commit to purchasing the travel products.

7. A computer readable medium containing instructions for controlling a computer system to perform a method for aggregating and satisfying demands from different users for at least one item, the method comprising:

aggregating information reflecting demand for an item based on input requests from different users for the item, each request having been received from a different user and including different user identification information, wherein said aggregating step aggregates requests from different users for the item and the information for each different user is aggregated independent of a commitment by the different user to purchase the item;

providing aggregated information to a plurality of suppliers, each capable of supplying the item without also providing user identification information from the request;

receiving at least one proposed response from at least one of the suppliers, including a proposal for providing the item to the different users; and providing the proposed response to the different users based on the user identification information, whereby the different users can determine whether to commit to purchasing the item.

8. A computer readable medium containing instructions for controlling a computer system to perform a method for aggregating and satisfying demands from different users for travel products, the method comprising:

aggregating information reflecting demand for a set of travel products based on input requests from different users, each request having been received from a different user and including user identification information, wherein said providing step provides the information independent of a commitment by the users to purchase the travel products;

selecting a proposed group travel product based on the aggregated information; and providing information reflecting the proposed group travel product to the different users based on the user identification information, whereby the different users can determine whether to commit to purchasing the travel products.

9. The computer readable medium of claim 8, wherein selecting a group of travel products based on the aggregated information includes:

providing the aggregated information to a plurality of travel product suppliers, wherein said providing step provides the information independent of a commitment by the different users to purchase the travel products; and receiving responses from a set of the travel product suppliers, each response including information reflecting a proposed group travel product, wherein each proposed group travel product reflects a discount for the corresponding travel product that is determined based on the aggregated information, and wherein the step of providing information reflecting the group travel product to the different users based on the user-identification information includes:

transmitting travel option information related to at least one of the proposed group travel products to a set of different users based on the aggregated information, whereby the different users can determine whether to commit to purchasing the travel products.

10. A method according to claim 1, wherein
said aggregating step aggregates a plurality of items that collectively form a set of travel products, said providing aggregated information provides aggregated information to a plurality of suppliers, wherein each supplier is at least capable of supplying at least one of the items in the set of travel products, said receiving receives proposed responses from at least one supplier for each item in the set of travel products, and said providing the proposed response gathers the proposed responses into at least one proposed set of travel products and provides information reflecting the proposed set of travel products to the different users.

11. A method according to claim 10, wherein a first supplier has a first discount on a first item in the set of travel products and a second supplier has a second discount on a second item in the set of travel products, and wherein said providing the proposed response selects the items respectively from said first and second supplier and provides information reflecting the first and second discounts to the different users.

12. A system according to claim 4, wherein
said aggregating information instruction aggregates a plurality of items that collectively form a set of travel products, said providing aggregated information instruction provides aggregated information to a plurality of suppliers, wherein each supplier is at least capable of supplying at least one of the items in the set of travel products, said receiving instruction receives proposed responses from at least one supplier for each item in the set of travel products, and said providing the proposed response instruction gathers the proposed responses into a proposed at least one set of travel products and provides information reflecting the proposed set of travel products to the different users.

13. A system according to claim 12, wherein a first supplier has a first discount on a first item in the set of travel products and a second supplier has a second discount on a second item in the set of travel products, and wherein said providing the proposed response instruction selects the items respectively from said first and second supplier and provides information reflecting the first and second discounts to the different users.

14. A computer readable medium according to claim 7, wherein said aggregating information aggregates a plurality of items that collectively form a set of travel products, said providing aggregated information provides aggregated information to a plurality of suppliers, wherein each supplier is at least capable of supplying at least one of the items in the set of travel products, said receiving receives proposed responses from at least one supplier for each item in the set of travel products, and said providing the proposed response gathers the proposed responses into at least one proposed set of travel products and provides information reflecting the proposed set of travel products to the different users.

15. A computer readable medium according to claim 14, wherein a first supplier has a first discount on a first item in the set of travel products and a second supplier has a second discount on a second item in the set of travel products, and wherein said providing the proposed response selects the items respectively from said first and second supplier and provides information reflecting the first and second discounts to the different users.

16. A method for aggregating and satisfying demands from different users for at least one item, the method comprising the steps performed by a data processing system of:

electronically aggregating information reflecting demand for an item based on input requests from different users for the item, each request having been received from a different user and including user identification information associated with the different user;

providing aggregated information to a plurality of suppliers, each capable of supplying the item without also providing user identification information from the request;

receiving at least two proposed responses from one or more of the suppliers, where each response includes a proposal for providing the item to the different users; and providing the at least two proposed responses to the different users based on the user identification information, to thereby allow the different users to evaluate the at least two proposed responses.

17. A system for aggregating and satisfying demands from different users for at least one item, comprising:

a processor for executing programs; and a memory for storing a program executable by the processor, the stored program including instructions for (i) aggregating information reflecting demand for an item based on input requests from different users for the item, each request having been received from a different user and including user identification information, (ii) providing aggregated information to a plurality of suppliers, each capable of supplying the item without also providing user identification information from the requests, (iii) receiving at least two proposed responses from one or more of the suppliers, including a proposal for providing the item to the different users, and (iv) providing the at least two proposed responses to the different users based on the user identification information, to thereby allow the different users to evaluate the at least two proposed responses.

18. A computer readable medium containing instructions for controlling a computer system to perform a method for aggregating and satisfying demands from different users for at least one item, the method comprising:

aggregating information reflecting demand for an item based on input requests from different users for the item, each request having been received from a different user and including user identification information associated with the different user;

providing aggregated information to a plurality of suppliers, each capable of supplying the item without also providing user identification information from the request;

receiving at least two proposed responses from one or more of the suppliers, where each response includes a proposal for providing the item to the different users; and providing the at least two proposed responses to the different users based on the user identification information, to thereby allow the different users to evaluate the at least two proposed responses.

19. A method for aggregating and satisfying demands from different users for at least one item, the method comprising the steps performed by a data processing system of:

electronically aggregating information reflecting demand for an item based on input requests from different users for the item, each request having been received from a different user and including user identification information;

providing aggregated information to a plurality of suppliers, each capable of supplying the item without also providing user identification information from the request, wherein said providing step provides the aggregated information to the suppliers independent of any predetermined maximum price for the items;

receiving at least one proposed response from at least one of the suppliers, including a proposal for providing the item to the different users, wherein a proposed price for the items is set by the supplier and independent of any predetermined maximum price; and providing the proposed response to the different users based on the user identification information, wherein the different users can determine whether to commit to purchasing the item based at least on the price set by the supplier.

20. A system for aggregating and satisfying demands from different users for at least one item, comprising:

a processor for executing programs; and a memory for storing a program executable by the processor, the stored program including instructions for (i) aggregating information reflecting demand for an item based on input requests from different users for the item, each request having been received from a different user and including user identification information associated with the different user, (ii) providing aggregated information to a plurality of suppliers, each capable of supplying the item without also providing user identification information from the requests, wherein said providing step provides the aggregated information to the suppliers independent of any predetermined maximum price for the items, (iii) receiving at least one proposed response from at least one of the suppliers, including a proposal for providing the item to the different users, wherein a proposed price for the items is set by the supplier and independent of any predetermined maximum price, and (iv) providing the proposed response to the different users based on the user identification information, wherein the different users can determine whether to commit to purchasing the item based at least on the price set by the supplier.

21. A computer readable medium containing instructions for controlling a computer system to perform a method for aggregating and satisfying demands from different users for at least one item, the method comprising:

aggregating information reflecting demand for an item based on input requests from different users for the item, each request having been received from a different user and including user identification information associated with the different user;

providing aggregated information to a plurality of suppliers, each capable of supplying the item without also providing user identification information from the request, wherein said providing step provides the aggregated information to the suppliers independent of any predetermined maximum price for the items;

receiving at least one proposed response from at least one of the suppliers, including a proposal for providing the item to the different user, wherein a proposed price for the items is set by the supplier and independent of any predetermined maximum price; and providing the proposed response to the different users based on the user identification information, wherein the different users can determine whether to commit to purchasing the item based at least on the price set by the supplier.

* * * * *

UNITED STATES PATENT AND TRADEMARK OFFICE
CERTIFICATE OF CORRECTION

| | | |
|---|---|---|
| PATENT NO. | : 7,376,611 B1 | Page 1 of 1 |
| APPLICATION NO. | : 09/438957 | |
| DATED | : May 20, 2008 | |
| INVENTOR(S) | : Jones | |

It is certified that error appears in the above-identified patent and that said Letters Patent is hereby corrected as shown below:

Column 9,

Line 45, "in formation" should read --information--.

Column 10,

Line 45, "navel" should read --travel--.

Signed and Sealed this

Twenty-ninth Day of July, 2008

JON W. DUDAS
*Director of the United States Patent and Trademark Office*